United States Patent Office 2,764,571
Patented Sept. 25, 1956

2,764,571

VINYL CHLORIDE POLYMERS PLASTICIZED WITH A MIXTURE OF GLYCOL DIBENZOATES

Robert S. Montgomery, Midland, Mich., assignor to The Dow Chemical Company, Midland, Mich., a corporation of Delaware No Drawing. Application March 21, 1955, Serial No. 495,814

1 Claim. (Cl. 260—31.4)

This invention relates to a mixture of dialkylene glycol dibenzoates having surprising utility as the plasticizer for organic thermoplastics such as polyvinyl chloride, copolymers in which vinyl chloride is the predominant copolymerized constituent, and the thermoplastic cellulose ethers and esters.

Other factors being equal, it is customary and desirable to select the least volatile agent for use as plasticizer in compositions of thermoplastic high polymers. Among the plasticizers which have been used in polyvinyl chloride compositions, and in high vinyl chloride copolymer compositions, are the dibenzoates of diethylene glycol and of dipropylene glycol. In a standard test, to be described later, these dibenzoates are 6.4 and 7.5 per cent volatile, respectively. These values are lower than those of many other plasticizers, but it would be preferred to use agents with even less volatility if such agents would exhibit the same degree of compatibility with the polymer that is shown by these dibenzoates.

According to the present invention, the desired result is obtained through the use of a mixture of from 10 to 70 per cent diethylene glycol dibenzoate and correspondingly from 90 to 30 per cent dipropylene glycol dibenzoate.

It has been found that the utility of agents which plasticize organic thermoplastics such as the high vinyl chloride polymers is inversely proportional to the volatility of such agents in the following accelerated test. Five grams of the plasticizer is placed in an open Petri dish in an oven controlled at 100° C., and air at this temperature is blown over the open dish for 100 hours. The loss in weight is determined and is reported as the volatility of the sample in terms of the percentage of the original sample weight.

Diethylene glycol dibenzoate and dipropylene glycol dibenzoate, and various mixtures of the two, were subjected to the described volatility test. The results are tabulated below. The freezing points of some of the samples were also determined.

| Diethylene glycol dibenzoate | Dipropylene glycol dibenzoate | Percent volatile | Freezing point, °C. |
|---|---|---|---|
| 100 | 0 | 6.4 | 28 |
| 90 | 10 | 7.8 | 17 |
| 80 | 20 | 6.2 | 9 |
| 70 | 30 | 5.4 | −1 |
| 60 | 40 | 4.5 | |
| 50 | 50 | 3.6 | −7 |
| 30 | 70 | 4.0 | |
| 10 | 90 | 4.2 | |
| 0 | 100 | 7.5 | −30 |

It is noted that the freezing point curve is nearly linear, but that the volatility curve has three major inflection points. Thus, the second sample has greater volatility than either of its constituents alone, while all mixtures of from 10 to 70 per cent diethylene glycol dibenzoate and 90 to 30 per cent dipropylene glycol dibenzoate are significantly less volatile than either individual constituent.

It has been found that the mixtures of reduced volatility retain their ability to plasticize polyvinyl chloride and such high vinyl chloride copolymers as those containing up to 40 per cent of vinylidene chloride or of vinyl acetate. Articles made from the so-plasticized compositions retain their plasticity under normal use conditions for such long periods that the limit of service life has not been determined. Similar advantage is found in other thermoplastic compositions employing these palsticizers, including compositions of ethyl cellulose or cellulose acetate.

I claim:

A plasticized polyvinyl chloride composition in which the plasticizer consists essentially of a mixture of from 10 to 70 per cent by weight of diethylene glycol dibenzoate and correspondingly from 90 to 30 per cent by weight of dipropylene glycol dibenzoate.

References Cited in the file of this patent

UNITED STATES PATENTS 1,739,315    Kessler et al.    Dec. 10, 1929
2,070,331    Derby et al.    Feb. 9, 1937

OTHER REFERENCES

Ser. No. 404,514, Manchen et al. (A. P. C.), published April 20, 1943.